(12) United States Patent
Du et al.

(10) Patent No.: US 9,886,509 B2
(45) Date of Patent: Feb. 6, 2018

(54) METHOD AND APPARATUS FOR PROCESSING A QUERY BASED ON ASSOCIATING INTENT AND AUDIENCE

(75) Inventors: Nan Du, Beijing (CN); Hao Wang, Beijing (CN); Liang Guo, Qingyang (CN); Yidong Cui, Beijing (CN); Wendong Wang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 73 days.

(21) Appl. No.: 14/343,030

(22) PCT Filed: Sep. 8, 2011

(86) PCT No.: PCT/CN2011/079476
§ 371 (c)(1),
(2), (4) Date: Mar. 5, 2014

(87) PCT Pub. No.: WO2013/033903
PCT Pub. Date: Mar. 14, 2013

(65) Prior Publication Data
US 2014/0214818 A1   Jul. 31, 2014

(51) Int. Cl.
*G06F 17/30* (2006.01)
*G06Q 10/06* (2012.01)
(Continued)

(52) U.S. Cl.
CPC .. *G06F 17/30864* (2013.01); *G06F 17/30702* (2013.01); *G06F 17/30867* (2013.01);
(Continued)

(58) Field of Classification Search
CPC ......... G06F 17/30864; G06F 17/30702; G06F 17/30867; G06Q 10/101; G06Q 10/063112; G06Q 50/01; G06Q 10/06311
(Continued)

(56) References Cited

U.S. PATENT DOCUMENTS 5,404,514 A * 4/1995 Kageneck ........... G06F 17/3061
6,098,066 A * 8/2000 Snow ................ G06F 17/30011
(Continued)

FOREIGN PATENT DOCUMENTS

CN   1197242 A   10/1998
CN   101217515 A   7/2008
(Continued)

OTHER PUBLICATIONS

Bogers, Toine, et al., "Expertise Classification: Collaborative Classification vs. Automatic Extraction", 17th Annual ASIS&T SIG/CR Classification Research Workshop, Nov. 4, 2006, pp. 1-20.*
(Continued)

*Primary Examiner* — Robert Stevens
(74) *Attorney, Agent, or Firm* — Ditthavong & Steiner, P.C.

(57) ABSTRACT

An approach is provided for determining the intent of a question and determining an appropriate audience to answer the question based on the intent of the question. The approach comprises processing and/or facilitating a processing of a query to cause, at least in part, a determination of one or more topics of the query based, at least in part, on one or more user preferences. The approach also comprises processing and/or facilitating a processing of the query to cause, at least in part, a determination of a classification of the query, The approach further comprises determining an audience comprising one or more candidate audience members for the query based, at least in part, on the classification of the query and the one or more topics of the query.

18 Claims, 15 Drawing Sheets

(51) Int. Cl.
*G06Q 10/10* (2012.01)
*G06Q 50/00* (2012.01)

(52) U.S. Cl.
CPC ... *G06Q 10/063112* (2013.01); *G06Q 10/101* (2013.01); *G06Q 50/01* (2013.01)

(58) Field of Classification Search
USPC .......................................................... 707/723
See application file for complete search history.

(56) References Cited

U.S. PATENT DOCUMENTS

| | | | | |
|---|---|---|---|---|
| 6,208,988 | B1* | 3/2001 | Schultz | G06F 17/30616 |
| 6,526,404 | B1* | 2/2003 | Slater | G06F 17/30867 |
| | | | | 707/728 |
| 6,938,068 | B1* | 8/2005 | Kraft | G06Q 10/10 |
| | | | | 709/203 |
| 7,603,350 | B1* | 10/2009 | Guha | G06F 17/30864 |
| 8,266,098 | B2* | 9/2012 | Hu | G06Q 10/00 |
| | | | | 707/607 |
| 2003/0028525 | A1* | 2/2003 | Santos | G06F 17/30867 |
| 2007/0094183 | A1* | 4/2007 | Paek | G06F 17/2715 |
| | | | | 706/45 |
| 2007/0130112 | A1* | 6/2007 | Lin | G06F 17/3002 |
| 2007/0208727 | A1 | 9/2007 | Saklikar et al. | |
| 2008/0016052 | A1* | 1/2008 | Frieden | G06F 17/30657 |
| 2008/0033959 | A1* | 2/2008 | Jones | G06F 17/30699 |
| 2009/0307205 | A1* | 12/2009 | Churchill | G06F 17/30867 |
| 2010/0131265 | A1* | 5/2010 | Liu | G06F 17/30867 |
| | | | | 704/9 |
| 2010/0332583 | A1* | 12/2010 | Szabo | G06F 17/30522 |
| | | | | 709/202 |
| 2011/0035329 | A1* | 2/2011 | Delli Santi | G06Q 30/02 |
| | | | | 705/347 |
| 2011/0055207 | A1* | 3/2011 | Schorzman | G06F 17/30699 |
| | | | | 707/723 |
| 2011/0055230 | A1* | 3/2011 | Castro | G06Q 10/10 |
| | | | | 707/751 |
| 2011/0087656 | A1 | 4/2011 | Oh et al. | |
| 2011/0106895 | A1* | 5/2011 | Ventilla | G06Q 10/10 |
| | | | | 709/206 |
| 2011/0119264 | A1* | 5/2011 | Hu | G06Q 10/00 |
| | | | | 707/728 |
| 2011/0246910 | A1* | 10/2011 | Moxley | G06F 17/30861 |
| | | | | 715/758 |
| 2012/0143862 | A1* | 6/2012 | Jones | G06F 17/30699 |
| | | | | 707/732 |
| 2013/0282698 | A1* | 10/2013 | Oztekin | G06F 17/30554 |
| | | | | 707/722 |

FOREIGN PATENT DOCUMENTS

| | | |
|---|---|---|
| CN | 101257512 A | 9/2008 |
| CN | 101540739 A | 9/2008 |

OTHER PUBLICATIONS

Budalakoti, Suratna, et al., "Authority vs Affinity: Modeling User Intent in Expert Finding", SocialCom 2010, Minneapolis, MN, Aug. 20-22, 2010, pp. 371-378.*
Liu, Fang, et al., "Personalized Web Search by Mapping User Queries to Categories", CIKM '02, McLean, VA, Nov. 4-9, 2002, pp. 558-565.*
Lopez, Vanessa, et al., "Merging and Ranking Answers in the Semantic Web: The Wisdom of Crowds", ASWC 2009, LNCS 5926, Springer-Verlag, Berlin, Germany, © 2009, pp. 135-152.*
Maybury, Mark, et al., "Awareness of Organizational Expertise", International Journal of Human-Computer Interaction, Jun. 2002, 12 pages.*
Metze, Florian, et al., "The 'Spree' Expert Finding System", ICSC 2007, Irvine, CA, Sep. 17-19, 2007, pp. 551-558.*
Schafermeier, Ralph, et al., "Using Domain Ontologies for Finding Experts in Corporate Wikis", I-SEMANTICS 2011, Graz, Austria, Sep. 7-9, 2011, pp. 63-70.*
Shapira, Bracha, et al., "Personalized Search: Integrating Collaboration and Social Networks", Journal of the American Society for Informational Science and Technology, vol. 62, No. 1, Jan. 2011, pp. 146-160.*
Si, Xiance, et al., "Confucius and Its Intelligent Disciples: Integrating Social with Search", Proc. of the VLDB Endowment, vol. 3, No. 2, © 2010, pp. 1505-1516.*
Yang, Stephen J.H., et al., "Improving peer-to-peer search performance through intelligent social search", Expert Systems with Applications, vol. 36, Issue 7, Sep. 2009, pp. 10312-10324.*
Merriam-Webster's Collegiate Dictionary, 10th Edition, Merriam-Webster, Inc., Springfield, MA, © 2000, p. 211.*
Fang, Hui, et al., "Probabilistic Models for Expert Finding", ECIR 2007, LNCS 4425, Springer-Verlag, Berlin, Germany, © 2007, pp. 418-430.*
Random House Webster's College Dictionary, Random House, Inc., New York, NY, © 2000, p. 1053.*
Microsoft Computer Dictionary, 5th Edition, Microsoft Press, Redmond, WA, © 2002, p. 423.*
International Search Report for PCT/CN2011/079476 dated Jun. 14, 2012, Two (2) pages.
Communication pursuant to Rules 70(2) and 70a(2) EPC and Extended European Search Report for corresponding European Patent Application No. 11872039.0-1952 dated May 12, 2015, 6 pages.
Wikipedia, "Web search engine", Jun. 15, 2011, retrieved on Apr. 30, 2015 from http://en.wikipedia.org/w/index.php?title=Web_search_engine&0ldid=434490675, 2011, 8 Pages.
Office Action for corresponding Chinese Patent Application No. 201180073506.X, dated Jun. 28, 2016, English Language Summary Included, 17 pages.

* cited by examiner

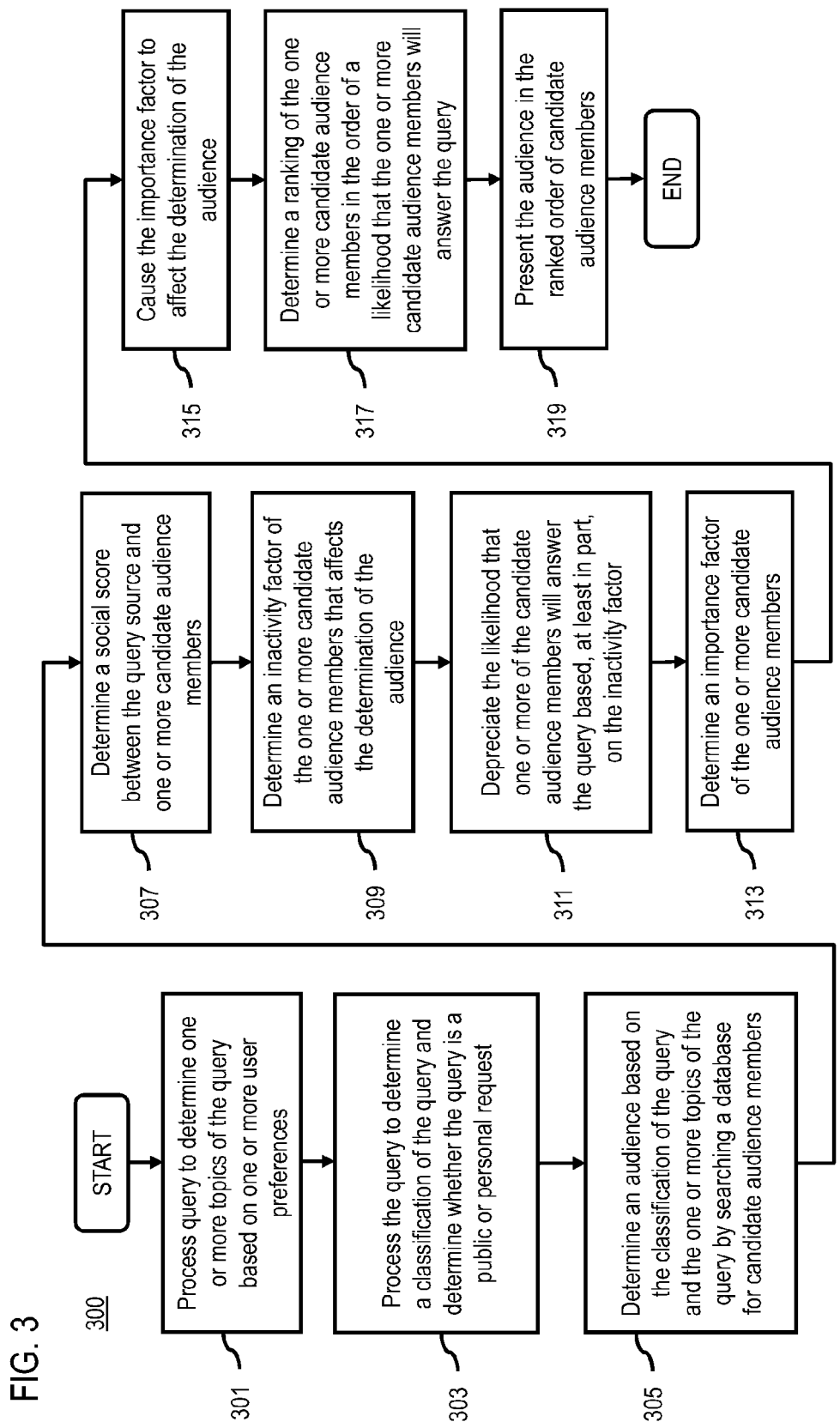

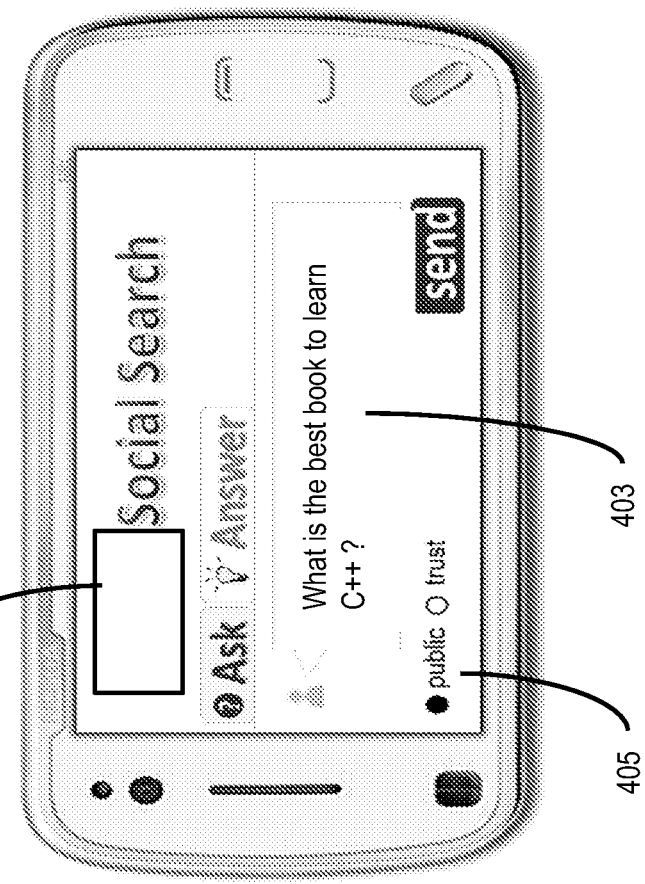
FIG. 4A

# METHOD AND APPARATUS FOR PROCESSING A QUERY BASED ON ASSOCIATING INTENT AND AUDIENCE

CROSS REFERENCE TO RELATED APPLICATION

This application is a U.S. National Phase Application of PCT/CN2011/079476, filed Sep. 8, 2011, the content of which is incorporated herein by reference in its entirety.

BACKGROUND

Service providers and device manufacturers (e.g., wireless, cellular, etc.) are continually challenged to deliver value and convenience to consumers by, for example, providing compelling network services. Social networking question and answer applications are popular web applications. Most social networking question and answer applications do not take a type of question and an available audience for the question into consideration.

SOME EXAMPLE EMBODIMENTS

Therefore, there is a need for an approach for determining the intent of a question and determining an appropriate audience to answer the question based on the intent of the question.

According to one embodiment, a method comprises processing and/or facilitating a processing of a query to cause, at least in part, a determination of one or more topics of the query based, at least in part, on one or more user preferences. The method also comprises processing and/or facilitating a processing of the query to cause, at least in part, a determination of a classification of the query. The method further comprises determining an audience comprising one or more candidate audience members for the query based, at least in part, on the classification of the query and the one or more topics of the query.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of a query to cause, at least in part, a determination of one or more topics of the query based, at least in part, on one or more user preferences. The apparatus is also caused to process and/or facilitate a processing of the query to cause, at least in part, a determination of a classification of the query. The apparatus is further caused to determine an audience comprising one or more candidate audience members for the query based, at least in part, on the classification of the query and the one or more topics of the query.

According to another embodiment, a computer-readable storage medium carries one or more sequences of one or more instructions which, when executed by one or more processors, cause, at least in part, an apparatus to process and/or facilitate a processing of a query to cause, at least in part, a determination of one or more topics of the query based, at least in part, on one or more user preferences. The apparatus is also caused to process and/or facilitate a processing of the query to cause, at least in part, a determination of a classification of the query. The apparatus is further caused to determine an audience comprising one or more candidate audience members for the query based, at least in part, on the classification of the query and the one or more topics of the query.

According to another embodiment, an apparatus comprises means for processing and/or facilitating a processing of a query to cause, at least in part, a determination of one or more topics of the query based, at least in part, on one or more user preferences. The apparatus also comprises means for processing and/or facilitating a processing of the query to cause, at least in part, a determination of a classification of the query. The apparatus further comprises means for determining an audience comprising one or more candidate audience members for the query based, at least in part, on the classification of the query and the one or more topics of the query.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for determining the intent of a question and determining an appropriate audience to answer the question based on the intent of the question, according to one embodiment;

FIGS. 4A-4I are diagrams of user interfaces utilized in the processes of FIG. 3, according to various embodiments;

DESCRIPTION OF SOME EMBODIMENTS

Examples of a method, apparatus, and computer program for determining the intent of a question and determining an appropriate audience to answer the question based on the intent of the question are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
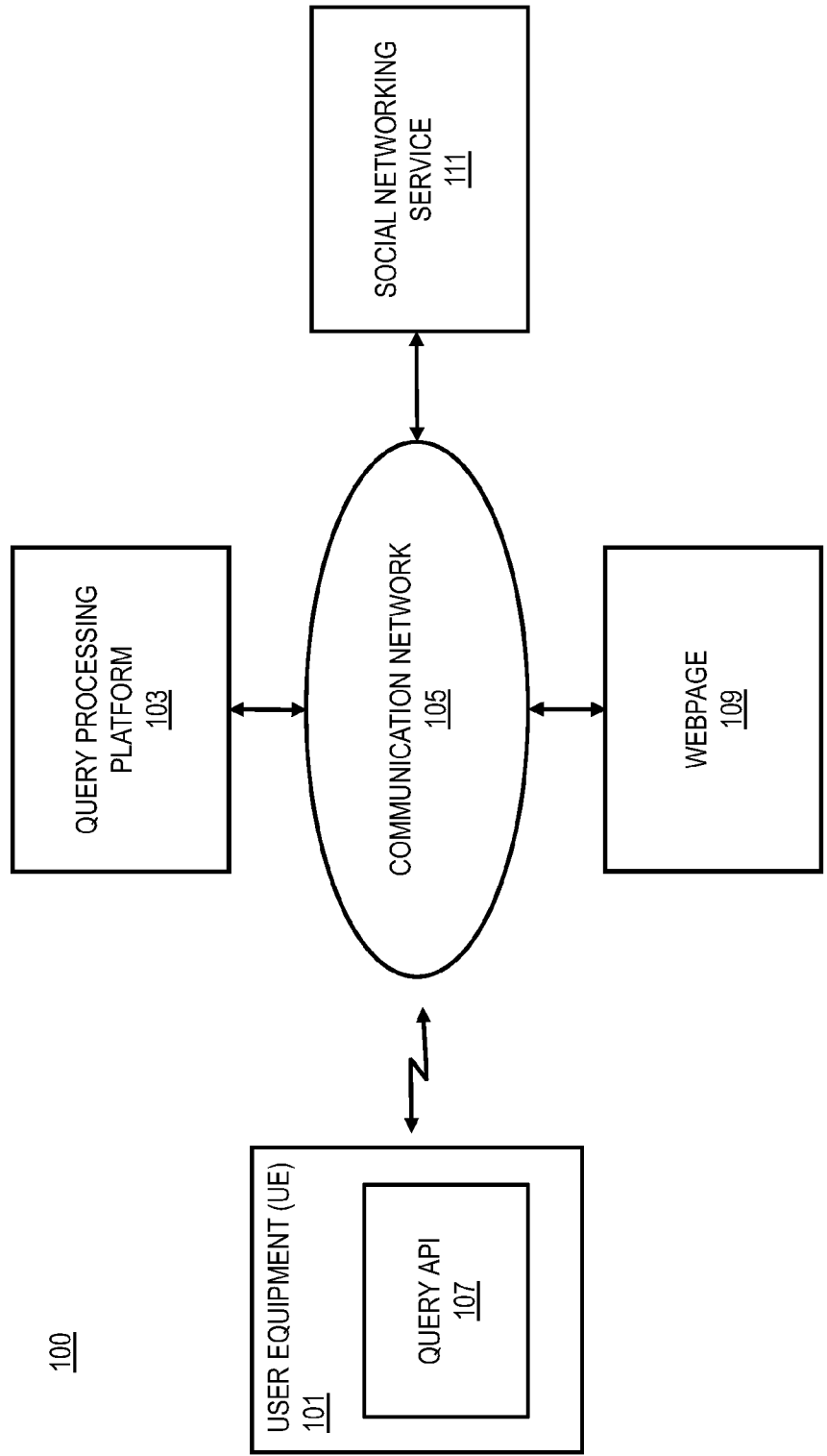
FIG. 1 is a diagram of a system capable of determining the intent of a question and determining an appropriate audience to answer the question based on the intent of the question, according to one embodiment.

FIG. 1 is a diagram of a system capable of determining the intent of a question and determining an appropriate audience to answer the question based on the intent of the question, according to one embodiment. Social network question and answer applications are popular web applications that seek to find the right person to answer a given question. However, when a user submits a question to conventional applications, the intention of the question is unknown. That is, one question type may be to get an exact answer, while another question type may be to ask for a favor. For example, if a user asks "can anyone tell me the best book for learning C++," the user wants an answer to the question, likely from a person that knows C++. Alternatively, if a user asks "can anyone help take care of my dog," the user is asking for a favor from family, friends, or a dog walking service.

In addition to determining the intent of a question, users sometimes would like to have answers or suggestions coming from people the user trusts. For example, a user might ask "where can I find a good babysitter for my boy?" Such a question is most likely directed at friends or families who are more reliable than advertisements for finding a babysitter to care for the user's children. Conventional social network question and answer systems do not take both of the intent of the question and the intended audience into consideration.

To address this problem, a system 100 of FIG. 1 introduces the capability to determine the intent of a question and determine an appropriate audience to answer the question based on the intent of the question. Question and answer systems are search systems that expect to handle one or more users' different types of queries in real-time. The system 100 provides for a means for understanding the latent trust between one or more user of a social network and for determining any personal requirements of a user may for answering one or more queries. The system 100 also provides for a means for finding the best candidates to respond to the one or more queries.

As shown in FIG. 1, the system 100 comprises a user equipment (UE) 101 having connectivity to a query processing platform 103, one or more web pages 109 and one or more social networking services 111 via a communication network 105. A user of the UE 101 uses a query API 107 to search for an answer to an entered query from the one or more web pages 109 and/or the one or more social networking services 111. The answer may come from one or more of the user's social connections, any random user of the social networking service, advertiser, etc. depending on the user's determined trust level and the intent of the question input into the query API 107.

In one embodiment, a user submits a query into the query API 107 such as "what is the best book to learn C++?" The query API 107 may have an option to designate the inputted question as a "public" question or a "trusted" question. A public question would be a question broadcast to any number of other users of the social networking service 111, while a trusted question would be sent to other users that meet a certain predetermined trust criteria based on, for example, a trust score, a social distance, social graph, etc.

The query processing platform 103 may parse the query into a set of key words {"C++", "book", "best", "learn", etc.} and then calculate a probability of 0.9 that this query belongs to programming topics.

If the user designated the query as a public query in the query API 107, another user, in that user's social networking profile, may have designated certain interests such as C++, Python, KTV, Programming, Entertaining, etc. Based on the other user's indicated interests and/or knowledge, a proficiency score may be calculated.

Such a course of events occurs because, according to one embodiment, each user u has a collection of topics he (she) favors defined as Tu which is part of the set of all the topics T. Given a query q, the query processing platform 103 maps q to a subset of T, denoted as Tq. The query processing platform 103 further classifies query q into two classes, namely: public question vs. personal request. The query processing platform 103 then computes the probability that query q belongs to each class, denoted as $P_{rc}$. The query processing platform then gives the candidate users who could answer query q by searching for the social networking service 111.

According to various embodiments, the query processing platform 103 provides candidate users who could answer query q by searching for the social networking service 111 based on the following model:

$$\text{rank}(ui, uj, q) = e^{-\alpha t(ui)} \times [P_{rc} \times TRR(ui, q) + (1 - P_{rc}) \times R(ui, uj)] \times \text{Inf}(ui)$$

ui is the candidate person who may solve q for user uj.

TRR(ui,q) measures the similarity between user ui's profile and the given query q based on the sets Tu and Tq, which is a proficiency score.

R(ui,uj) measures the social distance between user ui and uj calculated from the online social network, which is a social score.

e−at(ui) punishes the potential score of inactive users.

$P_{rc}$ is the probability that q belongs to the public query class.

Inf(ui) measures the importance of user ui on the social network.

Continuing with the above example, the query processing platform calculates that the query, based at least on the parsing, has a probability of 0.85 for being a public question, so Prc=0.85. Additionally, a social distance between users may be determined. For example, a short social distance may be determined if two users are connected in the social network 111 as friends, family, friends of friends, etc. If, a user a friend of friend of another user, the social distance result is R(user 1, user 2)=0.9. Therefore, query processing platform 103 forwards the user's request to the other user.

In one embodiment, a user submits a query into the query API 107 such as "where can I find a good babysitter for my boy?" The query API 107 may have an option to designate the inputted question as a "public" question or a "trusted" question. A public question would be a question broadcast to any number of other users of the social networking service 111, while a trusted question would be sent to other users that meet a certain predetermined trust criteria based on, for example, a trust score, a social distance, social graph, etc.

The query processing platform 103 may parse the query into a set of key words {"babysitter," "good," etc.} and then calculate a probability of 0.9 that this query belongs to early education topics.

If the user designated the query as a trusted query in the query API 107, another user, in that user's social networking profile, may have designated certain interests such as babysitter, dancing, KTV, Early Education, Entertaining, etc. Based on the other user's indicated interests and/or knowledge, a proficiency score may be calculated.

Using the model discussed above, the query processing platform 103 calculates that the query has a probability of 0.75 for being a public question. However, since the user emphasizes more on "trust," the query processing platform 103 adjusts the probability of being a public question to be 0.3. In this example, the second user's TRR value is only 0.4, however based on the similarity between the users' profiles, but the second user has a high R(social distance between users)=0.95. Accordingly, because this is a trust calculation, a user having a higher R is ranked above a user having a lower R for answering the trusted query and the candidate member for responding to the question is presented to the user.

By way of example, the UE 101, query processing platform 103, web page 109 and social networking service 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
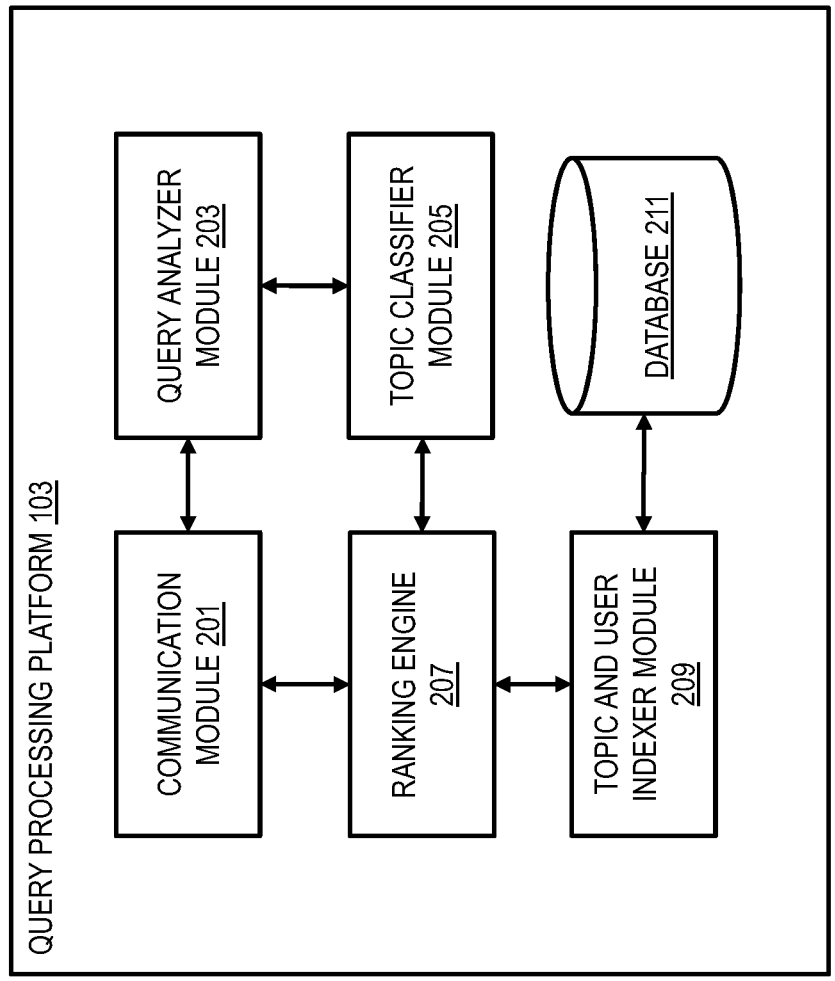
FIG. 2 is a diagram of the components of query processing platform, according to one embodiment.

FIG. 2 is a diagram of the components of the query processing platform 103, according to one embodiment. By way of example, the query processing platforms 103 includes one or more components for providing determining the intent of a question and determining an appropriate audience to answer the question based on the intent of the question. It is contemplated that the functions of these components may be combined in one or more components or performed by other components of equivalent functionality. In this embodiment, the query processing platform 103 includes a communication module 201, a query analyzer module 203, a topic classifier module 205, a ranking engine 207, a topic and user indexer module 209 and a database 211.

According to various embodiments, a user inputs a query into the query API 107, the query processing platform 103 receives the query by way of communication module 201. The query analyzer module 203 maps the query to a topic or subset of any available topic. The topic classifier module 205 further classifies the query into two classes, namely a public question or a personal request. The topic classifier module 205 also computes the probability that a query belongs in each class. The ranking engine 207 provides candidate users of the social networking service 111 that could answer the query by searching the database 211 by way of the topic and user indexer module 209 and/or the social networking service 111 by way of the communication module 201.

The ranking engine 207 ranks the users by applying the ranking model discussed above so as to present a ranking of candidate users based on the likelihood that you user can and will respond to the query. A multitude of factors may be considered in the ranking process such as a proficiency score, a similarity between users, a social distance, a trust connection, as well as negative factors such as inactivity (e.g., an inactive user is unlikely to be available to answer the query), low ratings by peers based on previous responses, and general importance of a user on the social network 111 (e.g., a user that is rated as being unpopular, may not be weighted as heavily as a popular user, popularity can be based on any number of issues such as total connections, expertise in an area of interest, ratings on past responses, activity, longevity on social network 111, status within an organization, job title, etc.).

Figure 6:
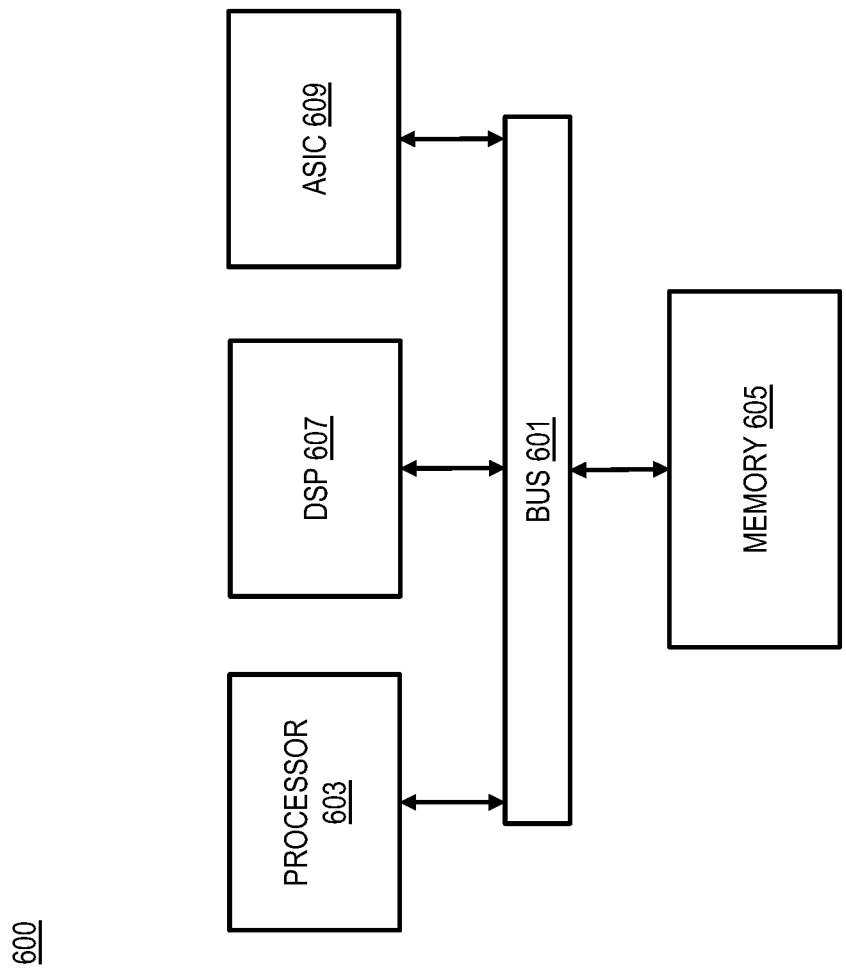
FIG. 6 is a diagram of a chip set that can be used to implement an embodiment of the invention.

FIG. 3 is a flowchart of a process for determining the intent of a question and determining an appropriate audience to answer the question based on the intent of the question, according to one embodiment. In one embodiment, the query processing platform 103 performs the process 300 and is implemented in, for instance, a chip set including a processor and a memory as shown in FIG. 6. In step 301, a query is processed to cause, at least in part, a determination of one or more topics of the query based, at least in part, on one or more user preferences. The process continues to step 303 in which the query is processed to cause, at least in part, a determination of a classification of the query to determine, for instance, whether the query is a public or a personal request. In one embodiment, the determination of the classification is based, at least in part, on a probability calculation, a rule-based calculation, a fuzzy logic-based calculation, and/or any other like calculation. For example, when using a probability calculation, the probability calculation may be affected by a user preference specifying the result of the probability calculation of the classification, and/or lending an added weight to the result of the probability calculation indicating a likelihood of the query being one of a public or personal request.

Next, in step 305, an audience is determined wherein the audience comprises one or more candidate audience members for the query based, at least in part, on the classification of the query and the one or more topics of the query by searches the database 211 and/or the social networking service 111 for the one or more candidate audience members based on one or more of any combination of determinations discussed below that relate to the above-mentioned model. The candidate audience members may also be determined by parsing the query into keywords so as to determine the one or more topics of the query and for matching the topics with one or more profiles or preferences set by other users of the social networking service 111 or any profiles stored in the database 211.

Then, in step 307, the query processing platform 103 determines a social score that is the social distance between the query source and the one or more candidate audience members. The audience determination includes determining a proficiency score based, at least in part, on the determined similarity between a query source and the one or more candidate audience members based, at least in part, on the determined one or more topics and one or more preferences of the one or more candidate audience members. The process continues to step 309 in which an inactivity factor is determined for one or more candidate audience members that affects the determination of the audience. The inactivity factor, as discussed above serves to weed out candidate audience members that may have a likelihood of not responding to the query.

Then, in step 311, the query processing platform 103 depreciates the likelihood that one or more of the candidate audience members will answer the query based, at least in part, on the inactivity factor. The process continues to step 313 in which the query processing platform 103 determines an importance factor of the one or more candidate audience members. The importance factor, as discussed above, is a weighting factor that considers a user's rating, social stature, ability to answer queries, etc. Next, in step 315, the query processing platform 103 causes the importance factor to affect the determination of the audience.

The process continues to step 317 in which the query processing platform 103 determines a ranking of the one or more candidate audience members in the order of a likelihood that the one or more candidate audience members will answer the query based on the model and the various determinations discussed above. Then, in step 319, the query processing platform 103 may, causes a presentation of the audience in the ranked order of candidate audience members.

FIGS. 4A-4I are diagrams of user interfaces utilized in the processes of FIG. 3, according to various embodiments.

FIG. 4A illustrates a user interface 401 in which a query has been designated as a public query. The public query designation 403 may cause the a calculation (e.g., a probability calculation, a rule-based calculation, a fuzzy logic-based calculation, etc.) that the query 405 is a public query to be weighted heavily toward being determined that the query is indeed a public query, or, according to other embodiments, may cause the query 405 to be designated as a public query without a probability determination.

Figure 4B:
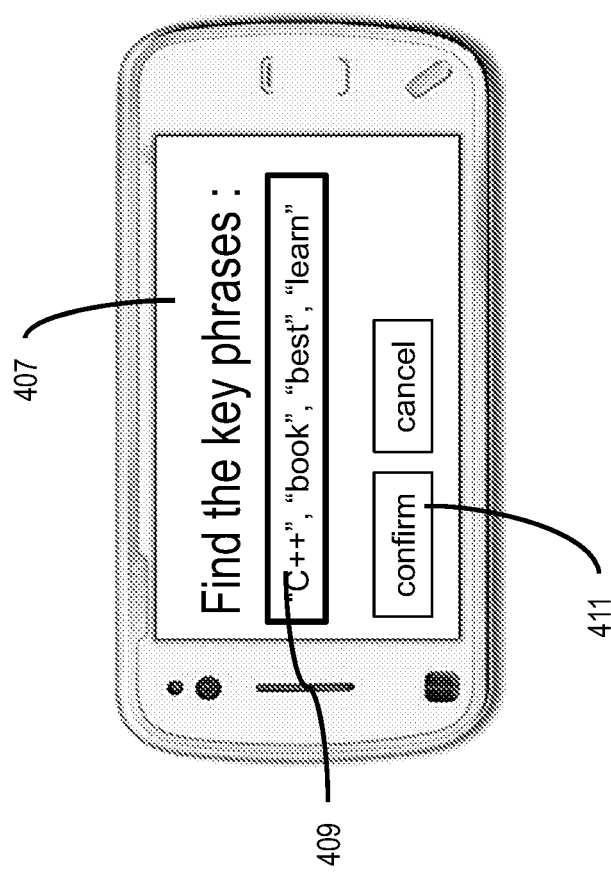

FIG. 4B illustrates a user interface 407 in which the query processing platform 103 parses the query 403 for keywords 409. The user may confirm the parsing for submission to the topic classifier module 205 using confirmation or cancel toggle 411.

Figure 4C:
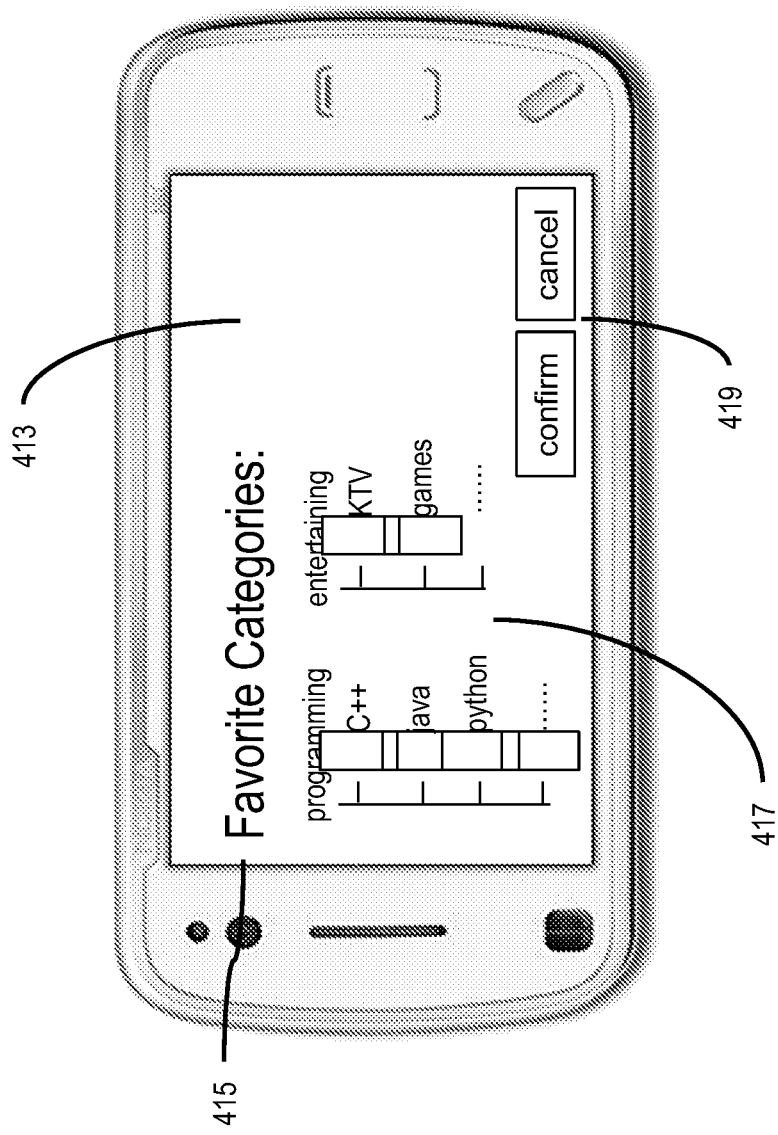

FIG. 4C illustrates a user interface 413 in which a user may identify his favorite categories 415 and/or subcategories 417 of interest and expertise. The user may confirm his selection by selecting toggle 419.

Figure 4D:
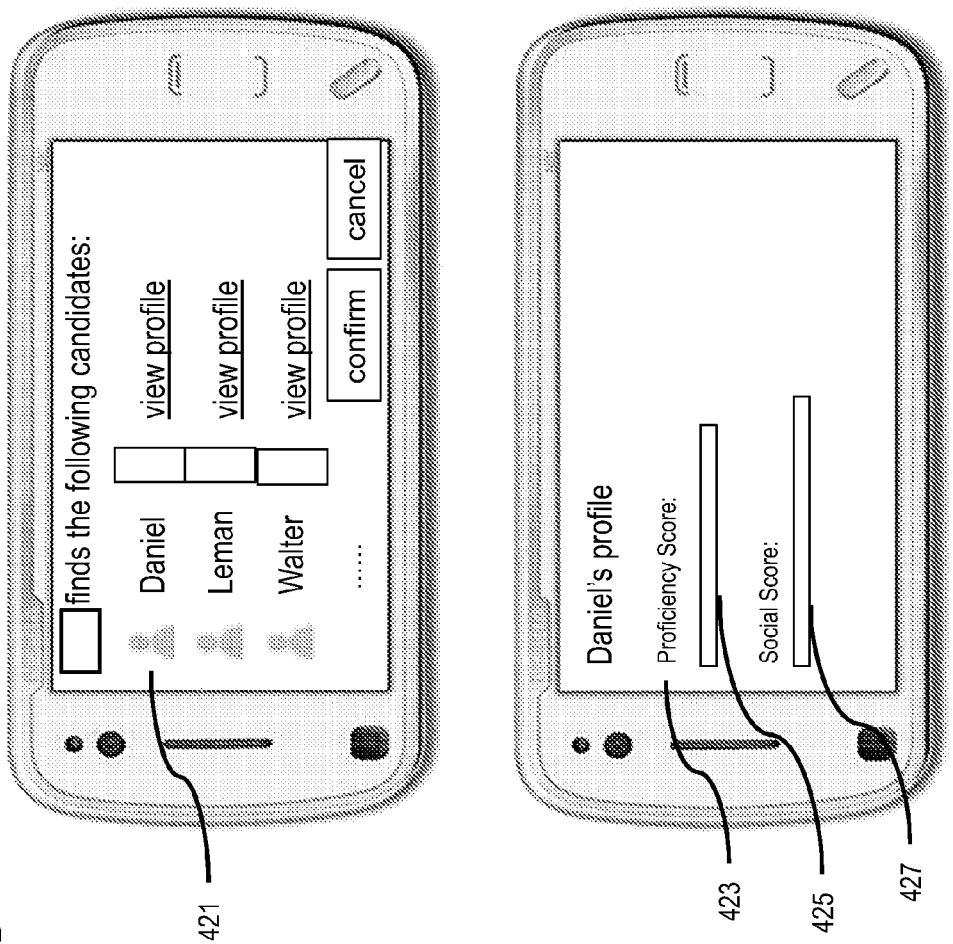

FIG. 4D illustrates user interfaces 421 and 423. User interface 421 illustrates a listing of candidate audience members in a ranked order. The ranking is based on a probability that the query is a public query and a social distance. User interface 413 illustrates one of the candidate audience member's calculated proficiency score 425 in the topic of the query and a social score 427.

Figure 4E:
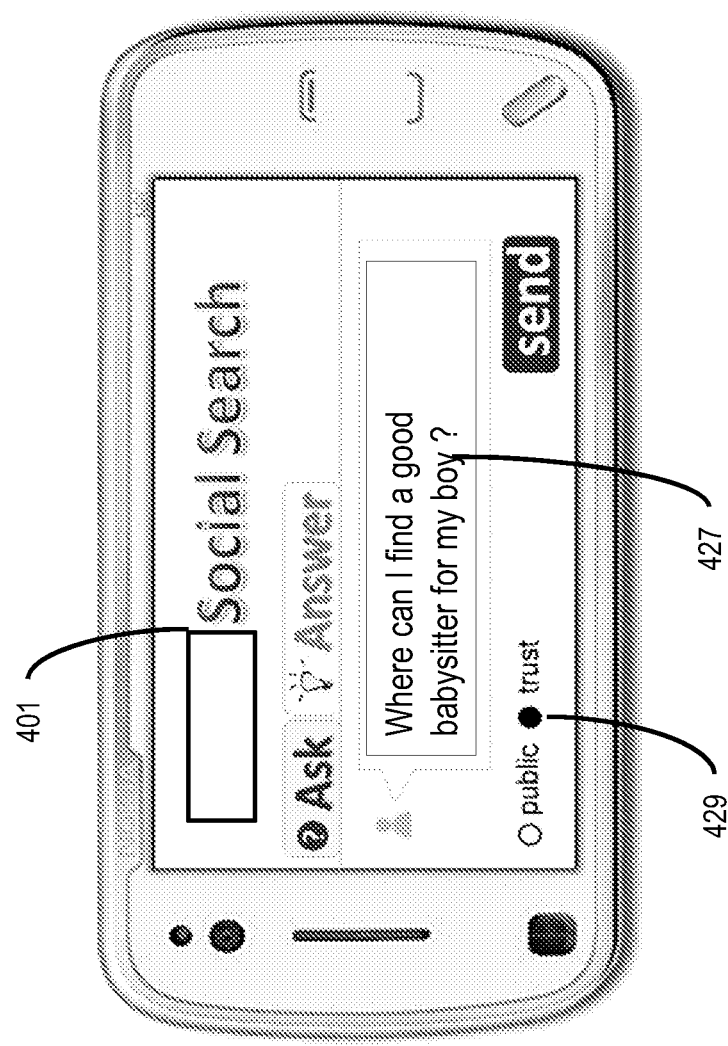

FIG. 4E illustrates the user interface 401 in which a query 427 has been designated as a trust query. The trust query designation 429 may cause the calculation (e.g., a probability calculation, a rule-based calculation, a fuzzy logic-based calculation, etc.) that the query 427 is a trust query to be weighted heavily toward being determined that the query is indeed a trust query, or, according to other embodiments, may cause the query 427 to be designated as a trust query without a probability determination.

Figure 4F:
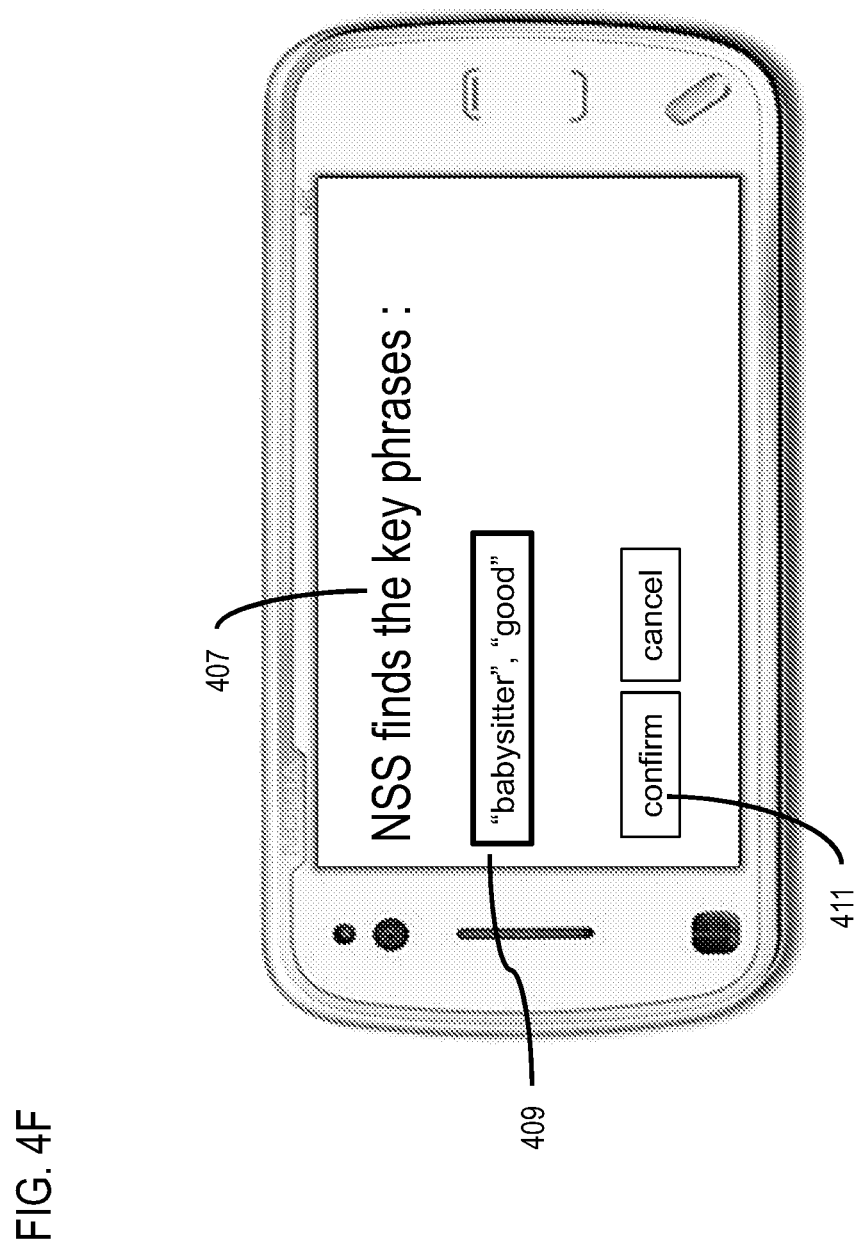

FIG. 4F illustrates the user interface 407 in which the query processing platform 103 parses the query 403 for keywords 409. The user may confirm the parsing for submission to the topic classifier module 205 using confirmation or cancel toggle 411.

Figure 4G:
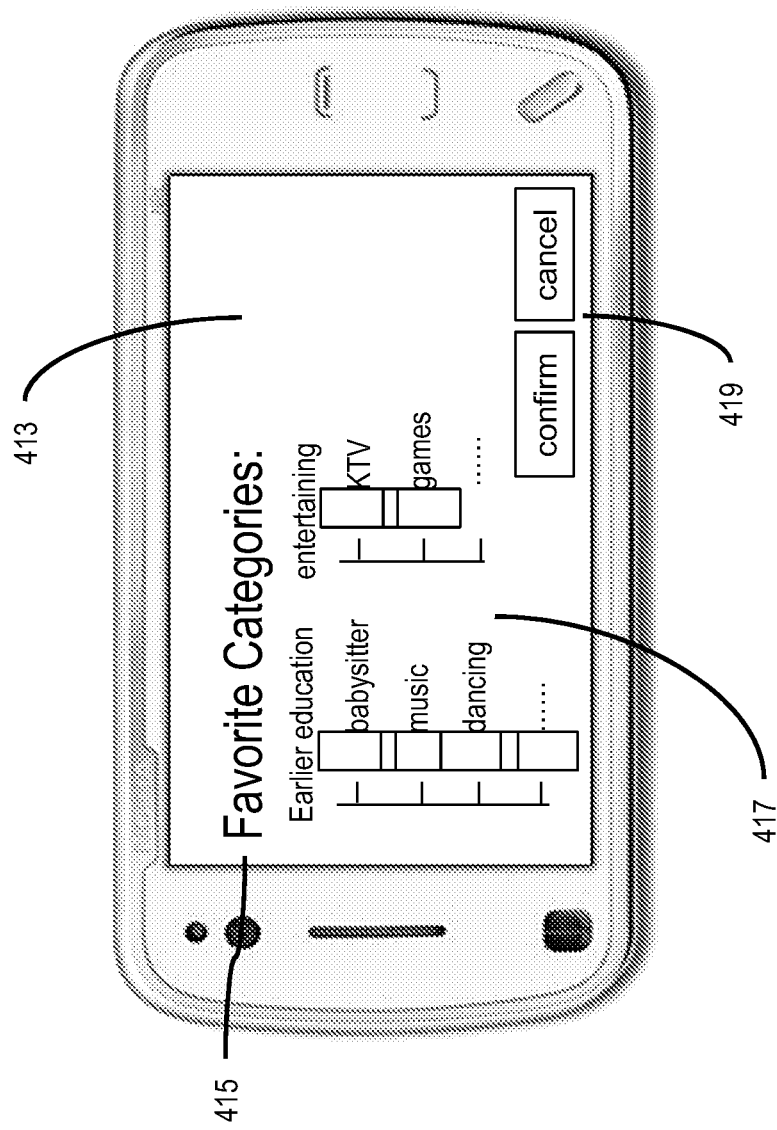

FIG. 4G illustrates the user interface 413 in which a user may identify his favorite categories 415 and/or subcategories 417 of interest and expertise. The user may confirm his selection by selecting toggle 419.

Figure 4H:
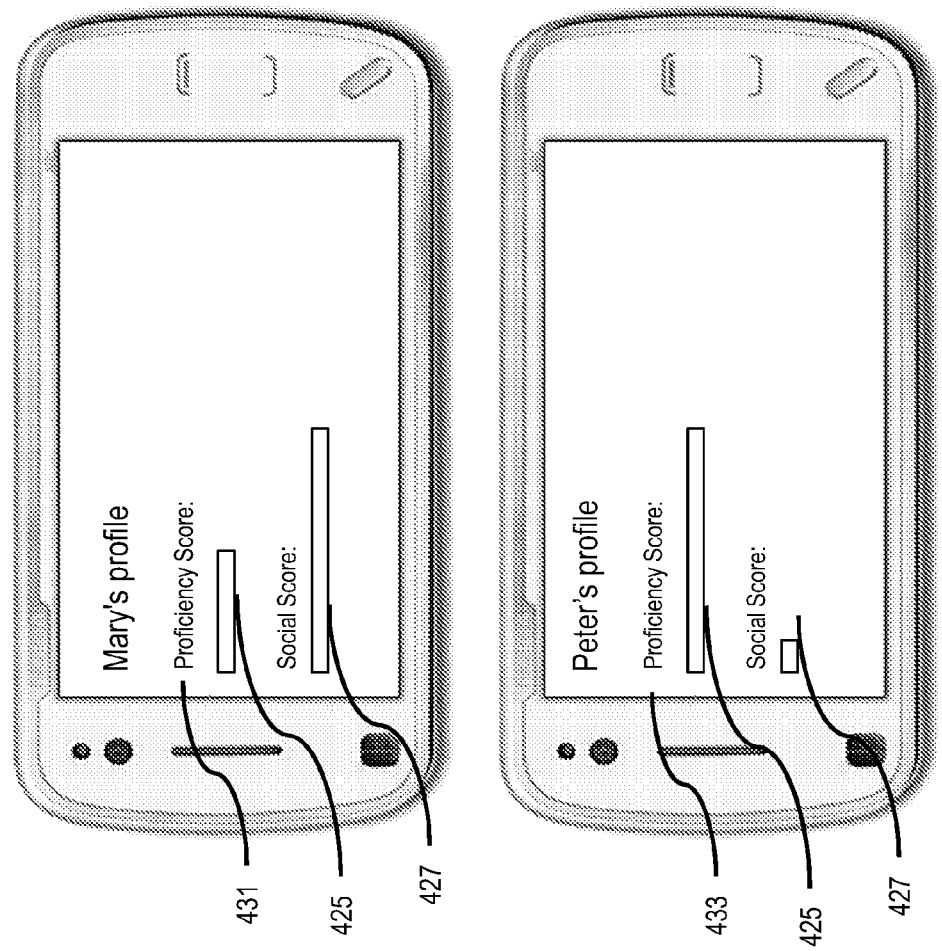

FIG. 4H illustrates a comparison between user profiles 431 and 433. User profile 431 has a lower proficiency score 425 and a higher social score 427 than user profile 433. The differences in the proficiency score 425 and the social score 427 are weighed when determining the ranking of the users for the candidate audience.

Figure 4I:
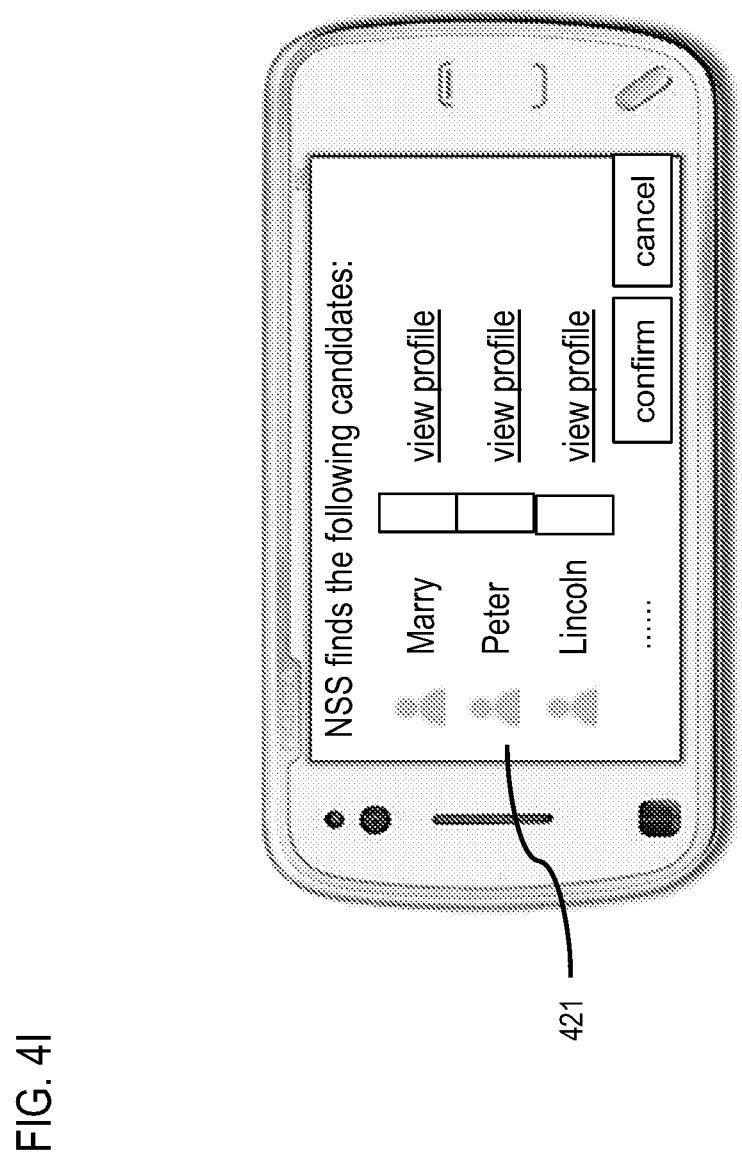

FIG. 4I illustrates user interface 421 wish shows a listing of candidate audience members in a ranked order. The ranking is based on a probability that the query is a public query and a social distance. In this example, because this is a trust calculation, the user 431 having the higher social score 427 is ranked above the user 433 having the higher proficiency score 425.

The processes described herein for determining the intent of a question and determining an appropriate audience to answer the question based on the intent of the question may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
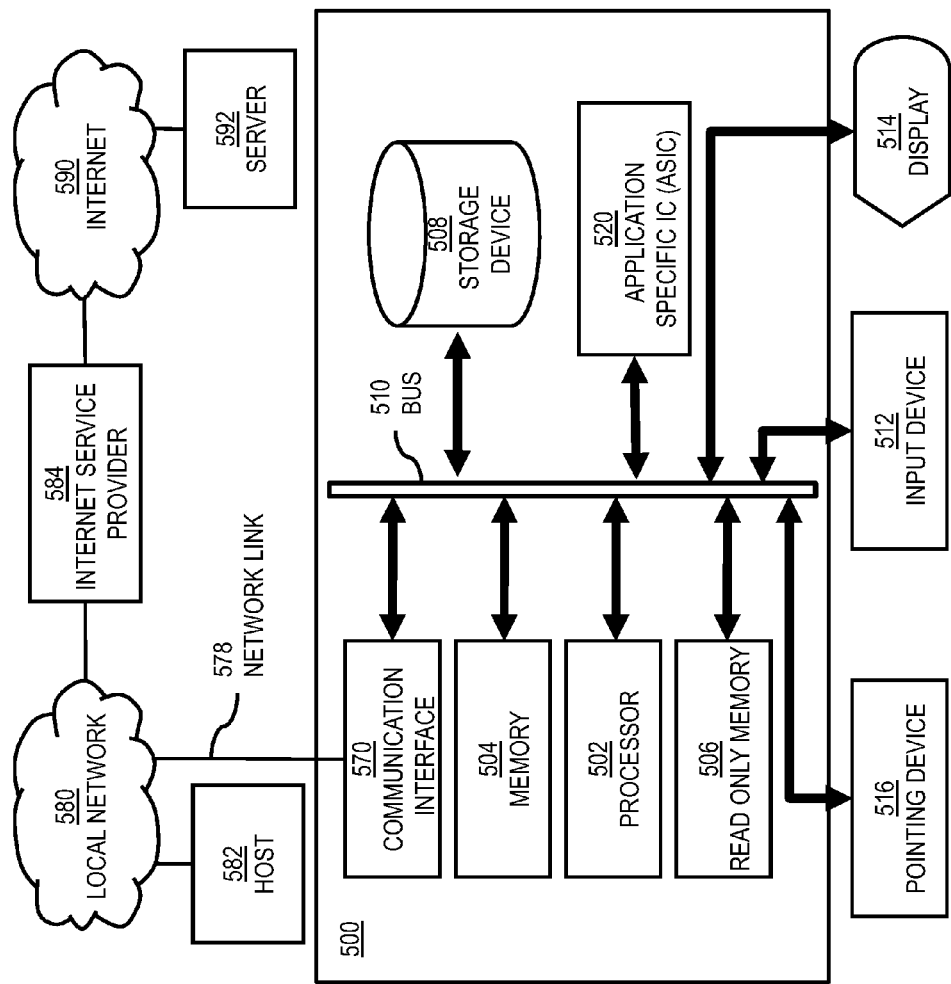
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to determine the intent of a question and determine an appropriate audience to answer the question based on the intent of the question as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of determining the intent of a question and determining an appropriate audience to answer the question based on the intent of the question.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to determine the intent of a question and determine an appropriate audience to answer the question based on the intent of the question. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for determining the intent of a question and determining an appropriate audience to answer the question based on the intent of the question. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for determining the intent of a question and determining an appropriate audience to answer the question based on the intent of the question, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for determining the intent of a question and determining an appropriate audience to answer the question based on the intent of the question to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to determine the intent of a question and determine an appropriate audience to answer the question based on the intent of the question as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of determining the intent of a question and determining an appropriate audience to answer the question based on the intent of the question.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to determine the intent of a question and determine an appropriate audience to answer the question based on the intent of the question. The memory 605 also stores the data associated with or generated by the execution of the inventive steps.

Figure 7:
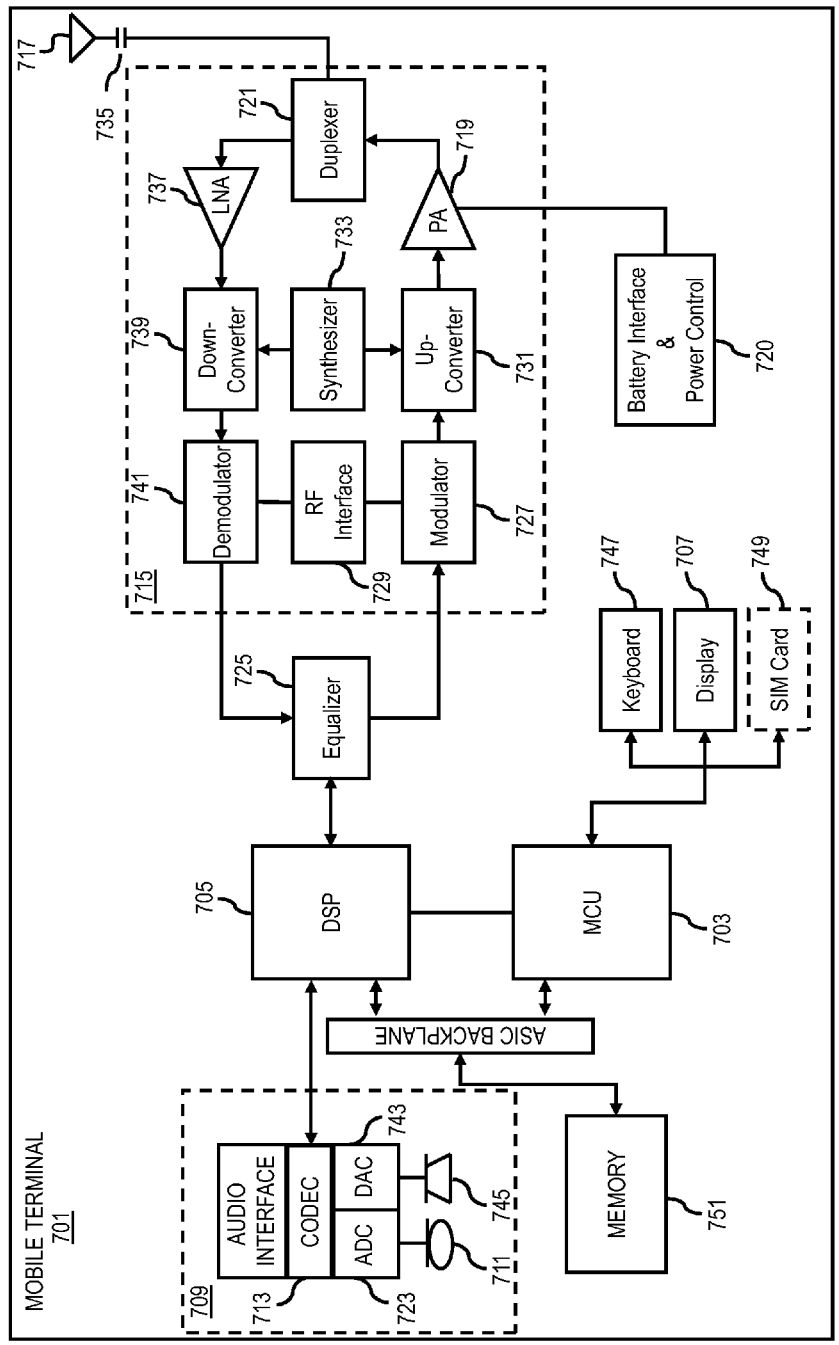
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of determining the intent of a question and determining an appropriate audience to answer the question based on the intent of the question. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of determining the intent of a question and determining an appropriate audience to answer the question based on the intent of the question. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to determine the intent of a question and determine an appropriate audience to answer the question based on the intent of the question. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for processing a query based on associating intent and audience, the method comprising:
   receiving, utilizing at least one interface, the query including text from a user;
   parsing, utilizing at least one processor, the text of the received query to identify one or more words and/or terms associated with the query;
   calculating a probability that the identified one or more words and/or terms are associated with one or more topics;
   identifying the associated one or more topics with the received query based on the calculated probability meeting or exceeding a predetermined threshold;
   mapping the identified one or more topics of the query to predetermined topics associated with the user based on one or more calculations determining a probability that the query belongs to the one or more topics that is a subset of the predetermined topics associated with the user;
   classifying the query as belonging to a public question class, a personal request class or a combination thereof based, at least in part, on the identified one or more topics;
   determining one or more candidate audience members for forwarding the query based, at least in part, on the classification of the query and the one or more mapped predetermined topics of the query associated with the user that are shared by the one or more candidate audience members; and
   forwarding, utilizing the at least one interface, the query via a network to one or more devices of the one or more candidate audience members.

2. A method of claim 1, wherein the one or more candidate audience members are further determined based on a proficiency score that is based, at least in part, on a similarity between the one or more topics of the query and topics associated with a profile of the one or more candidate audience members, wherein the profile includes one or more preferences of the one or more candidate audience members.

3. A method of claim 2, further comprising:
   determining a social score that is a social distance between the user and the one or more candidate audience members in one or more social networks,
   wherein the one or more candidate audience members are further determined based on the social score.

4. A method of claim 3, further comprising:
   determining an inactivity factor of the one or more candidate audience members that affects the determination of the audience; and
   initiating a depreciation of a likelihood that one or more of the candidate audience members will answer the query based, at least in part, on the inactivity factor, wherein the one or more candidate audience members are further determined based on the likelihood.

5. A method of claim 3, further comprising:
   determining an importance factor of the one or more candidate audience members in the one or more social networks,
   wherein the one or more candidate audience members are further determined based on the importance factor.

6. A method of claim 1, further comprising:
   determining a ranking of the one or more candidate audience members in the order of a likelihood that the one or more candidate audience members will answer the query; and
   initiating a presentation of the audience in the ranked order of candidate audience members.

7. A method of claim 1, further comprising:
   initiating a database search for the one or more candidate audience members ui based on following:

$$\mathrm{rank}(ui,uj,q) = e^{-\alpha t(ui)} \times [P_{rc} \times TRR(ui,q) + (1-P_{rc}) \times R(ui,uj)] \times Inf(ui)$$

wherein TRR(ui,q) is a proficiency score that measures a similarity between a profile of ui and the query q based on topics associated with the profile Tu and the one or more topics of the query Tq,
   R(ui,uj) is a social score that measures a social distance between ui and the user uj in one or more online social networks,
   e−at(ui) is an inactivity factor goes against the social score of ui,
   Prc is a probability that q belongs to a public query class, and
   Inf(ui) is an importance factor that measures importance of ui on the one or more online social networks.

8. A method of claim 1, wherein the classification is based, at least in part, on a rule-based calculation, a fuzzy logic-based calculation, or a combination thereof.

9. An apparatus for processing a query based on associating intent and audience, the apparatus comprising:
   at least one processor; and
   at least one memory including computer program code for one or more programs,
   the at least one memory and the computer program code configured to, with the at least one processor, cause the apparatus to perform at least the following,
   receive, utilizing at least one interface, the query including text from a user;
   parse, utilizing at least one processor, the text of the received query to identify one or more words and/or terms associated with the query;
   calculate a probability that the identified one or more words and/or terms are associated with one or more topics;
   identify the associated one or more topics with the received query based on the calculated probability meeting or exceeding a predetermined threshold;
   map the identified one or more topics of the query to predetermined topics associated with the user based on one or more calculations determining a probability that the query belongs to the one or more topics that is a subset of the predetermined topics associated with the user;

classify the query as belonging to a public question class, a personal request class or a combination thereof based, at least in part, on the identified one or more topics;

determine one or more candidate audience members for forwarding the query based, at least in part, on the classification of the query and the one or more mapped predetermined topics of the query associated with the user that are shared by the one or more candidate audience members; and forward, utilizing the at least one interface, the query via a network to one or more devices of the one or more candidate audience members.

10. An apparatus of claim 9, wherein the apparatus is further caused to:

determine a social score that is a social distance between the user and the one or more candidate audience members in one or more social networks, wherein the one or more candidate audience members are further determined based on the social score.

11. An apparatus of claim 10, wherein the apparatus is further caused to:

determine an importance factor of the one or more candidate audience members in the one or more social networks, wherein the one or more candidate audience members are further determined based on the importance factor.

12. An apparatus of claim 9, wherein the apparatus is further caused to:

determine an inactivity factor of the one or more candidate audience members that affects the determination of the audience; and initiate a depreciation of a likelihood that one or more of the candidate audience members will answer the query based, at least in part, on the inactivity factor, wherein the one or more candidate audience members are further determined based on the likelihood.

13. An apparatus of claim 9, wherein the apparatus is further caused to:

determine a ranking of the one or more candidate audience members in the order of a likelihood that the one or more candidate audience members will answer the query; and initiate a presentation of the audience in the ranked order of candidate audience members.

14. An apparatus of claim 9, wherein the apparatus is further caused to:

initiate a database search for the one or more candidate audience members ui based on following:

$$rank(ui, uj, q) = e^{-\alpha t(ui)} \times [P_{rc} \times TRR(ui,q) + (1-P_{rc}) \times R(ui, uj)] \times Inf(ui)$$

wherein TRR(ui,q) is a proficiency score that measures a similarity between a profile of ui and the query q based on topics associated with the profile Tu and the one or more topics of the query Tq, R(ui,uj) is a social score that measures a social distance between ui and the user uj in one or more online social networks, e−at(ui) is an inactivity factor goes against the social score of ui, Prc is a probability that q belongs to a public query class, and Inf(ui) is an importance factor that measures importance of ui on the one or more online social networks.

15. An apparatus of claim 9, wherein the determination of whether the query is a public question or a personal request is based, at least in part, on a user preference specifying the result of the classification.

16. An apparatus of claim 9, wherein the one or more candidate audience members are further determined based on a proficiency score that is based, at least in part, on a similarity between the one or more topics of the query and topics associated with a profile of the one or more candidate audience members, wherein the profile includes one or more preferences of the one or more candidate audience members.

17. A non-transitory computer program product including one or more sequences of one or more instructions which, when executed by one or more processors, cause an apparatus to at least perform the steps for processing a query based on associating intent and audience:

receiving, utilizing at least one interface, the query including text from a user;

parsing, utilizing at least one processor, the text of the received query to identify one or more words and/or terms associated with the query;

calculating a probability that the identified one or more words and/or terms are associated with one or more topics;

identifying the associated one or more topics with the received query based on the calculated probability meeting or exceeding a predetermined threshold;

mapping the identified one or more topics of the query to predetermined topics associated with the user based on one or more calculations determining a probability that the query belongs to the one or more topics that is a subset of the predetermined topics associated with the user;

classifying the query as belonging to a public question class, a personal request class or a combination thereof based, at least in part, on the identified one or more topics;

determining one or more candidate audience members for forwarding the query based, at least in part, on the classification of the query and the one or more mapped predetermined topics of the query associated with the user that are shared by the one or more candidate audience members; and forwarding, utilizing the at least one interface, the query via a network to one or more devices of the one or more candidate audience members.

18. A computer program product of claim 17, wherein the one or more candidate audience members are further determined based on a proficiency score that is based, at least in part, on a similarity between the one or more topics of the query and topics associated with a profile of the one or more candidate audience members, wherein the profile includes one or more preferences of the one or more candidate audience members.

* * * * *